Oct. 6, 1959         G. S. KNOX         2,907,589
SEALED JOINT FOR TUBING
Filed Nov. 5, 1956         3 Sheets-Sheet 1
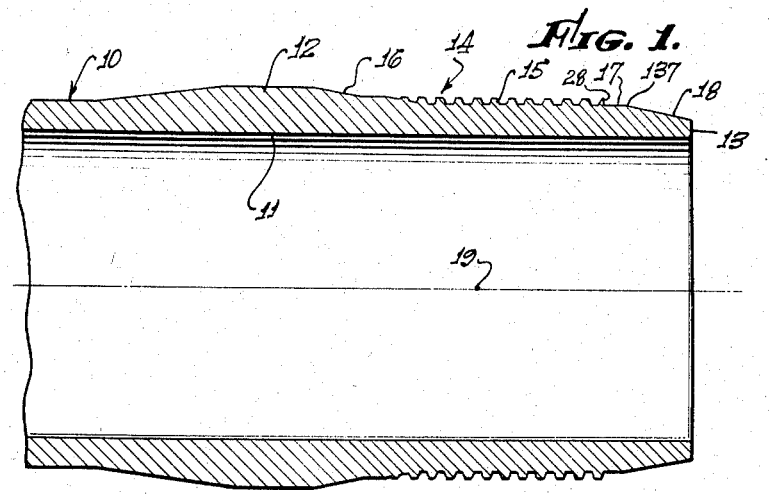
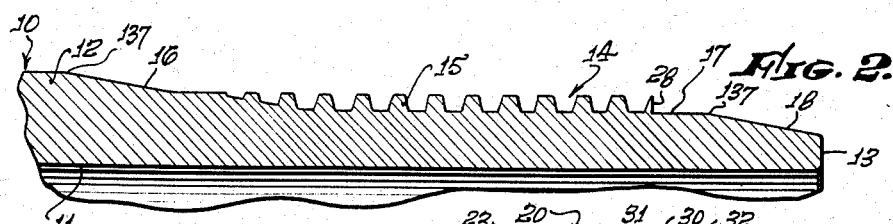
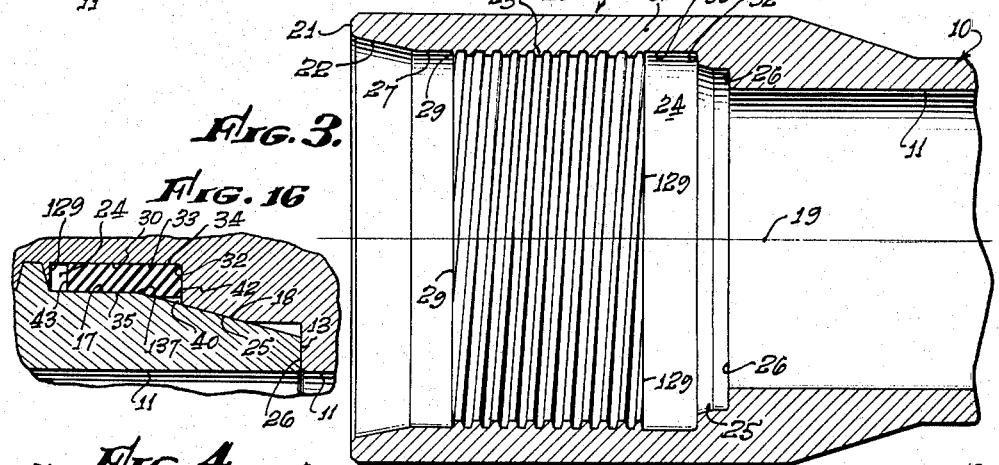
INVENTOR.
GRANVILLE S. KNOX,
By
ATTORNEY.

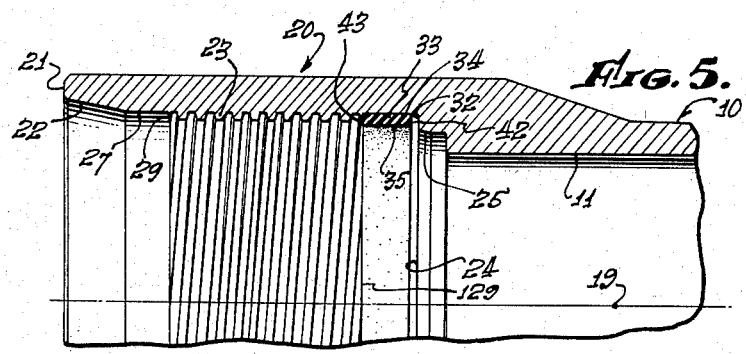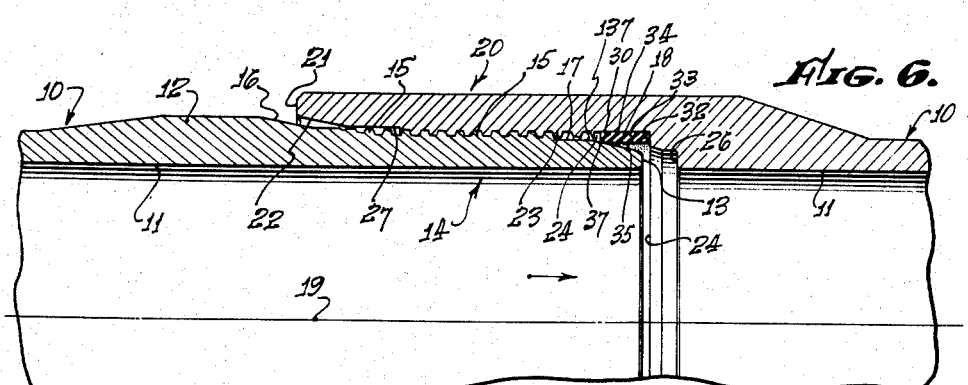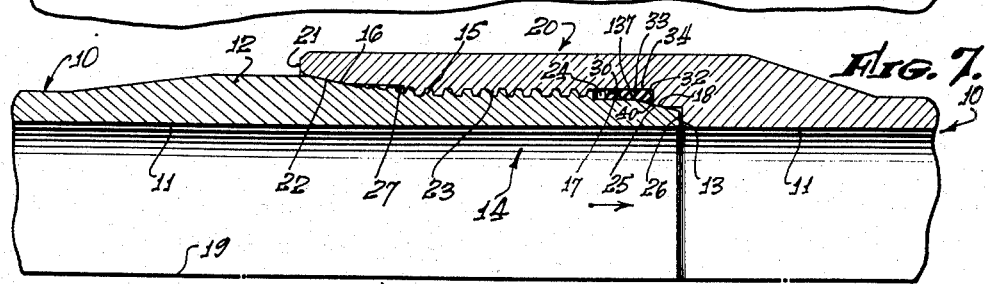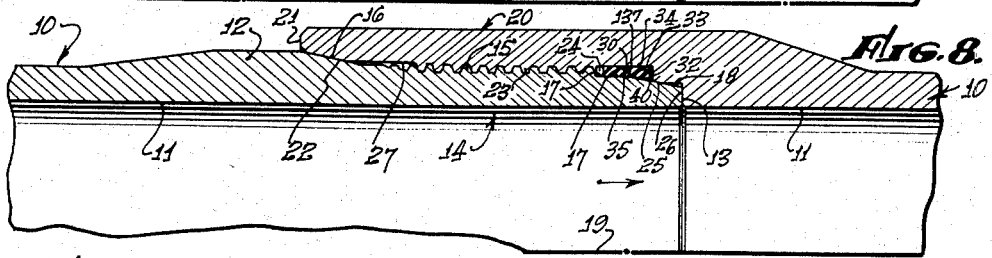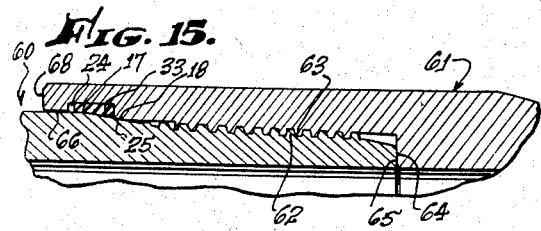

Oct. 6, 1959 G. S. KNOX 2,907,589
SEALED JOINT FOR TUBING
Filed Nov. 5, 1956 3 Sheets-Sheet 3
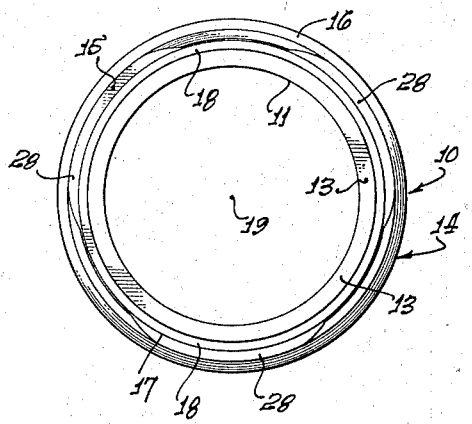
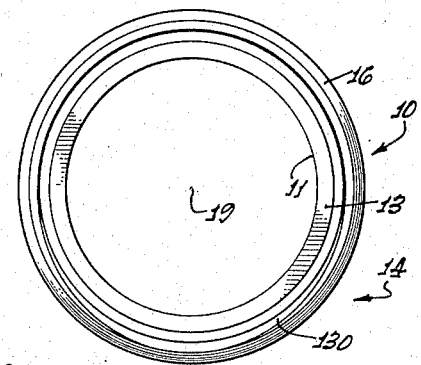
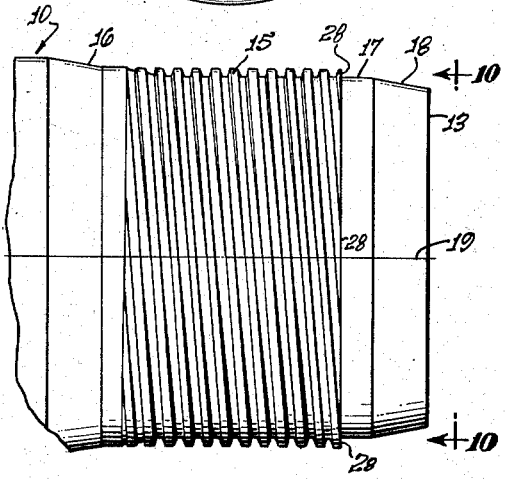
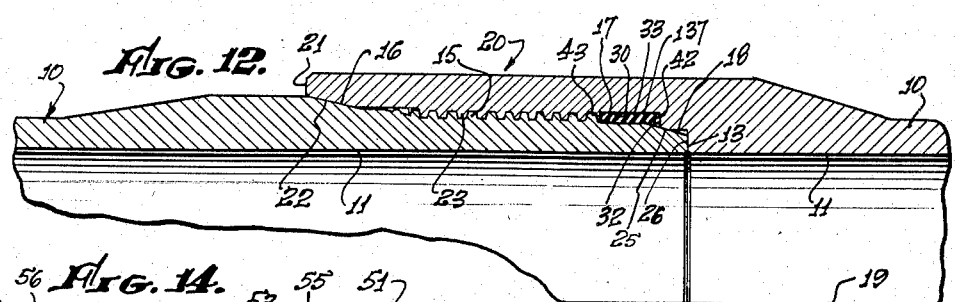
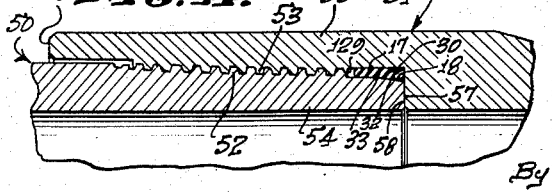
GRANVILLE S. KNOX,
INVENTOR.
By
ATTORNEY.

United States Patent Office 2,907,589
Patented Oct. 6, 1959

2,907,589

SEALED JOINT FOR TUBING

Granville S. Knox, Glendale, Calif., assignor to Hydril Company, Los Angeles, Calif., a corporation of Ohio Application November 5, 1956, Serial No. 620,358

6 Claims. (Cl. 285—95)

This invention relates generally to improvements in threaded pipe joints and more particularly has to do with the design and construction of sealed, screw-threaded oil well tubing and drill string joints characterized as capable of being rapidly made up to positively pressure sealed condition and broken apart without damage to the threads or seal either during make-up or breaking of the joint under conditions of repeated severe usage in the field. The improvements which are the subject of the present invention are applicable to inserted joints, wherein one pipe end is screwed directly into the end of another pipe end, to couplings in which the opposed ends of two pipes are threaded into a tubular collar and to other similar types of pipe end connections.

While many different designs of screw-threaded pin and box-type tubing and drill pipe joints have been proposed and used in the past, there have remained unsolved a number of problems having to do with the establishment of an adequate and enduring seal against the extremely high fluid pressures now being encountered in deep drilled oil and gas wells as for example, pressure as high as 15,000 p.s.i.

Rubber O-rings and compressible rubber gaskets have occasionally been used to seal pipe and tubing joints and when used to seal against relatively low pressures under certain operating conditions they have been fairly satisfactory; however, such seals have not been suitable for use under the high pressure and temperature conditions encountered in deep oil and gas wells because of a tendency for these relatively thin rubber rings to be badly damaged and often rendered useless by pressural extrusion into small clearances between the joint members at the seal ring groove. Compressive type rubber and asbestos ring gaskets have also been found susceptible to damage caused by a combination of sliding friction and high compressive loads resulting from high torque make up of the joint with power tools.

Other problems remaining include the fact that joints used for the purpose of connecting lengths of drill pipe and tubing must be made up with a tight fit on tapered lateral contact surfaces in order to provide the degree of rigidity needed to resist lateral bending strains with a minimum of fatigue. However, it is difficult to produce sealed joints having both a tight fit on tapered, lateral contact surfaces and a longitudinally compressed ring gasket because even very small variations in the machining of the tapered lateral contact surfaces results in large displacement variations in the longitudinal make-up of joints with resultant differences in the amount of compression applied to the ring gasket, which accordingly is often times damaged by being squeezed too tightly or is otherwise not squeezed sufficiently to seal.

Such difficulties have led to the use of special pipe and tubing joints having tapered seating elements employing highly polished, metal-to-metal fits as a means of sealing against very high well pressures, such joints when made up carefully under ideal conditions being capable of sealing against high pressures. This type of joint is on the other hand usually more costly to manufacture than the more commonly used pipe and tubing joints, and the polished seats are quite susceptible to damage when the joints are made up and broken out under conditions prevailing in the oil fields. Such damage may result from direct or sliding impact of the pin seat against the end of the box when the lower end of a suspended, relatively heavy pipe stand is stabbed into a joint on the upper end of the pipe, which precedes the suspended stand into the well.

In addition, the polished metal-to-metal seats are also quite susceptible to damage at the time the joints are screwed together, even very small particles of dirt or sand if trapped between the mating seats being capable of scoring or producing galling which completely destroys the effectiveness of the metal-to-metal seal. Excessive friction, caused by over-tightening, lack of lubrication and rapid make-up will occasionally cause the tight fitting metal-to-metal seats to gall during the last fraction of a turn as the joints are screwed together. As a means of preventing entrapment of dirt and sand particles between the seating surfaces as the joints are screwed together, it is customary to make the metal-to-metal contact between the seats relatively narrow. For instance, it is common practice to provide one joint member with an arcuate seating surface and the mating member with a conical seating surface thereby to obtain a line of contact between the two surfaces. However, narrow seating surfaces are not very desirable because they are quite vulnerable to the attack of corrosive fluids so often present in oil and gas wells. Corrosion need penetrate only a very short distance in order to completely destroy the line of contact existing between the two metal-to-metal surfaces.

Another disadvantage associated with conventional tubing and drill joints is that of thread damage caused by vertical stabbing of single threaded pin ends of suspended heavy pipe stands into single-threaded box ends of pipe or pipe collars supported therebeneath. Such damage usually occurs when the entire stabbing load falls upon the relatively thin and frail thread ends of single threaded pin and box members. Unfortunately, a damaged end thread on one joint member will often damage, and occasionally destroy, many additional threads on both members should the pin and box be screwed together before the thread end damage is discovered.

Wells are presently being drilled to much greater depths than previously, and drill pipe and tubing joints are often called upon to support very great tensile loads. In some types of single threaded joints it would be desirable to provide a greater length of thread for supporting these heavy loads; however increased thread length tends to increase the already objectionably large number of pipe revolutions required to make up the joint members.

Other problems associated with the design of conventional tubing and drill pipe joints include the danger of damaging the seal or completely dislodging it from its proper location between the joint members when the latter are unscrewed or broken apart, the seal being more readily damaged when mounted on the tubing pin, the tendency of the load carrying portion of the box or pin to be weakened by cutting a packing groove in one of the members to a depth substantially greater than the normal thread depth and thereby reduce the tensile and torsional strength of the members under extreme stresses, and also the problem of sealing casing and tubing against possible high external fluid pressures as well as internal pressures.

With the above discussion in mind, the construction of the present improved drill and tubing string joint is such that many of the mentioned problems are largely overcome, as will be seen, the improvements and benefits being derived from the construction and arrangement of the parts of the joint as a whole so that they perform a particular function and operate together to produce a superior joint.

In its sealed condition the joint comprises pin and box pipe ends formed to interfit as the pin is turned forwardly into the box, these pipe ends respectively including interengaged external and internal threads holding the pipes against separation and a pin annular bevel and rearward substantially cylindrical periphery intersecting the bevel and axially forwardly advanced opposite an annular recess formed in the box and bridging the intersection, together with an annular seal of internally tenacious relatively rigid plastic material received in the recess between axially spaced end walls thereof, the seal being in pressing engagement with annular portions of the pin bevel and cylindrical periphery and the opposing recess interior wall and preferably out of engagement with the remainder of the pin bevel. This arrangement of the joint components assures a predetermined degree of compression in the seal annulus and positive sealing action against fluid pressure entering the joint from within or without the pipes regardless of relative axial made-up position of the pin and box, since the inner diameter of the seal is expanded to the predetermined pin cylindrical size as the pin is advanced into the box, the outer diameter of the seal remaining unexpanded but being compressed against the recess interior wall. This degree of radial compression in the seal annulus produces some axial elongation and the recess is therefore made sufficiently wide to provide some initial end clearance for the seal.

The relatively extended axial lengths of the metal and plastic seal interfaces maximizes corrosion resistance and eliminates any necessity for precision machining tapered pin metal to box metal contact surfaces for sealing purposes, inasmuch as the relative axial positions of the pin and box are not critical to proper functioning of the seal ring.

The desirable anti-friction properties of tetrafluoroethylene make it particularly useful as a seal material. In addition, an annulus of molded tetrafluoroethylene has sufficiently balanced flexibility and rigidity to allow its shape to be momentarily distorted as necessary to permit its being snapped into position in the box recess from which it cannot be removed by mere retraction of the pin upon breaking the joint. Furthermore there may be provided additional end clearance for the seal in the recess into which dirt and sand may be wiped from the sealing surfaces of the seal and pin as the latter is advanced into the box. The existence of such end clearance after joint make up also eliminates the necessity for extremely close precision machining of the pin and box parts compressing the seal.

In its preferred form, the complete joint comprises axially interfitting pin and box pipe ends respectively including in axial sequence from the box end to the pin end a pair of interengaged shoulders normally tapered and acting to resist further turning of the pin into the box, closely interfitting cylindrical external and internal multiple threads holding the pin and box against endwise separation, a cylindrical periphery on the pin intersecting a beveled shoulder axially advanced into an annular recess sunk into the box, an external and internal pin and box tapers interengaged at the end of the recess. A seal of internally tenacious relatively rigid plastic material retained in the recess against axial removal therefrom is held in annular pressure sealing engagement with the cylindrical periphery and portions of the pin shoulder advanced into the recess and with the recess interior wall, some of the seal material being axially deformed toward the interengaged tapers. Such deformation occurs as the pin shoulder is axially advanced into the recess against the seal shoulder projecting radially therefrom, yet the seal has sufficient rigidity and reduced size in relation to the recess that progressive advancement of the pin shoulder into the recess does not effect deformation of any seal material into the space between the tapers being moved toward interengagement.

To prevent thread end damage from heavy impact loads during stabbing of the pin into the box, multiple helical threads are formed on both the pin and box, and imperfect threads having reduced thickness and depth nearest the end of the shank are absent to leave thick, sturdy multiple thread ends of full depth and relatively greater width exposed to absorb the stabbing impact loads. The pitch and helix angles of the threads are coincidentally increased to provide for fewer pipe revolutions in making up the joint, yet the loading on and holding capacity of the made up threads is not thereby diminished since the total interengaged thread surface area remains the same as it would otherwise be on the basis of a similarly sized single thread. Since fewer pipe revolutions are required to fully make up the joint the sliding friction between the seal and the cylindrical surfaces of the joint is held to a minimum and the joint can be made up and broken many times without any appreciable amount of wear upon the mating parts.

The recess is cut into the box at such location that the imperfect innermost threads which would normally be formed thereon are eliminated, leaving multiple full depth and greater thickness thread ends forming one wall of the recess. In the absence of imperfect threads on the pin, the made-up full-depth threads on the pin and box present their ends to the recess forming a flat wall against which the seal in the recess can be jammed by high fluid pressure entering the internal side of the joint without danger of seal extrusion into and between the end matching sets of threads. Also, when the pin is turned out of the box, the seal is prevented from being carried out with the pin by multiple point axial suspension or bearing thereof against the flat ends of the box threads facing the recess.

Other features of the invention include the provision of a packing recess having a depth substantially no greater than the thread depth so that the box is not weakened at the section through which maximum load is transferred to the main extent of the pipe, interengaged annular tapers at both ends of the joint that permit forceful though relatively slight expansion of the box and contraction of the pin as it is screwed into the box until stop shoulders on both these members come into engagement thereby frictionally locking the joint in made up condition, the use of a packing material such as tetrafluoroethylene that does not flow as greatly as rubber does under load application so that the seal cannot flow or extrude into small clearances under high fluid pressure exertion on the seal, and the reduction in the tensile load transmitted to the box, when the members are made up with high torque so that the pin end thrusts against the stop shoulder in the box, by reason of the increased thread helix angle made possible by the use of multiple threads, preferably three.

These and other features and objects of the invention, as well as the details of an illustrative embodiment, will be more fully understood from the following description of the drawings, in which:

Fig. 1 is a vertical section taken through the pin end of a pipe after it has been externally threaded;

Fig. 2 is an enlarged view of a portion of the Fig. 1 pin;

Fig. 3 is a longitudinal section taken through the box end of a pipe after it has been internally threaded and an internal recess has been formed therein;

Fig. 4 is an enlarged view of a portion of the Fig. 3 box;

Fig. 5 is a view similar to Fig. 3 showing the box with a seal in position in the recess;

Fig. 6 is a longitudinal section taken through the pin and box showing the former threaded part way into the latter with the pin coming in contact with the seal;

Fig. 7 is a view similar to Fig. 6 showing the pin and box tapers coming into engagement;

Fig. 8 is a view similar to Fig. 7 showing the joint fully made-up with a high torque so that the pin end bears against the box shoulder;

Fig. 9 is an external view of the triple threaded pin;

Fig. 10 is an end view of the pin taken on line 10—10 of Fig. 9;

Fig. 11 is an end view of a single threaded pin shown for purposes of comparison with Fig. 10;

Fig. 12 is a view similar to Fig. 8 illustrating the position of the seal upon application of very high fluid pressure thereto, the pressure entering the joint from the interior of the pipe;

Fig. 13 is a longitudinal section taken through a threaded collar receiving the threaded opposite pin ends of a pair of pipes, the principles of the invention being applied to this modified form of the joint;

Fig. 14 is a section taken through another modified joint;

Fig. 15 is a section taken through still another modified joint; and

Fig. 16 is an enlarged fragmentary view of a portion of Fig. 8.

In Figs. 1 and 2 the pipe 10 containing a bore 11 is shown thickened at 12, with that portion of the pipe between the thickening 12 and the pipe end 13 being designated generally as the pin 14. The latter is externally cylindrically threaded at 15 between axially spaced annular taper 16 and the cylindrical stepped pin periphery 17, the former extending between the thickening 12 and the thread, and the latter between the thread and the end taper or bevel 18, intersecting both the cylindrical periphery 17 at 137 and the pin end 13. The diameter of the pin periphery 17 is preferably made slightly less than the root diameter of the threads at 15 to prevent the periphery from being marred or grooved while the threads are being machined. The two tapers 16 and 18 may typically have an angularity with the bore axis 19 of about 10 degrees for purposes as will appear.

The box end 20 of the pipe is shown in Figs. 3 and 4 as being diametrically enlarged to receive the threaded pin previously described. The box inside includes in sequence from outer end 21 thereof an axial taper 22, bore 27, multiple cylindrical threads 23 an annular recess 24 cut into the box interior, another annular taper 25 and an annular stop shoulder 26 extending in a plane normal to the box axis 19 and intersecting the bore 11. The diameter of bore 27 is at least equal to the box thread root diameter so that the pin threads may be freely received in that bore for interengagement with the box threads, both sets of the multiple pin and box thread ends 28 and 29 being relatively wide and sturdy for maximum strength to resist impact loads during stabbing of the pin into the box.

The invention contemplates the use of more than one thread and preferably three threads on each of the pin and the box, so that three sturdy thread ends 28 and 29 on the pin and box respectively will receive the stabbing loads, and also to allow rapid make-up of the joint and also breaking thereof with a minimum number of pipe revolutions, as a result of increased thread helix angle. With three thread ends exposed during stabbing, the starting make-up of the joint is relatively easily and quickly initiated during stabbing, as distinguished from the starting makeup of a single thread joint even though the pin and box are axially somewhat misaligned, since at least one of the pin multiple thread ends is then in better position than the others to drop into an opening between the box multiple thread ends.

The recess 24 is cut into the box in such manner as to eliminate the interior imperfect thread ends produced upon tapping threads 23, leaving the three circularly spaced thread ends 129 forming one end wall of the recess. The interior wall 30 of the latter is cut into the box to a depth approximately equal to that of the threads 23 and substantially no greater than such depth so that the box section 31 opposite the recess is not excessively weakened, this section being required to transmit tensile and twisting loads when the string is put to use.

The opposite end wall 32 of the recess extends in a plane normal to the axis 19 and intersects the taper 25 which is spaced inwardly toward the axis 19 as respects the recess bottom 30 for reception of the pin taper 18. Finally, the box stop shoulder 26 is adapted to be engaged by the pin end 13 arresting any further turning of the pin into the box.

Figs. 5 and 6 illustrate the location of the annular seal 33 in the recess, the seal outer diameter 34 being co-extensive with the diameter of the recess interior wall 30, and the seal inner diameter 35 being somewhat less (preferably .010 to .015 of an inch less) than the outer diameter of the cylindrical shoulder or periphery 17 on the pin, in order that the seal may become pressed between the pin and the recess inner wall 30 as the pin is advanced into the box. The seal is preferably formed of an internally tenacious relatively rigid plastic material such as molded tetrafluoroethylene which is capable of being resiliently compressed, yet which does not flow appreciably under the application of high pressure thereto. This seal material has just about the right degree of balance between flexibility and rigidity to allow its shape to be distorted sufficiently to permit its being snapped into position in the box recess and from which it cannot thereafter be easily removed. The latter physical characteristic of the seal material is also important as respects the prevention of extrusion of the seal into the small clearances formed between the closely interfitting pin and box threads terminating at thread ends 28 and 129 which are aligned to form a flat end wall opposite end wall 32 when the joint is fully made up.

In Fig. 6 the pin is shown turned into the box to the point where the pin taper 18 has come into engagement with the seal edge 37. Clearly shown is the free reception of the pin threads 15 within the cylindrical bore 27 formed in the box and also the clearance between the box threads 23 and the cylindrical stepped periphery 17 of the pin.

In Fig. 7 the pin has been threaded into the box to the point where the respective box and pin tapers 16, 18, and 22 and 25 simultaneously come into interengagement, at which time the end 13 of the pin and the annular stop shoulder 26 on the box remain slightly spaced apart. With a box and pin having roughly the proportions shown in Figs. 1 and 3, the gap between the pin end and the box stop shoulder existing when the respective tapers come into interengagement should be approximately .010 inch, so that further turning of the pin into the box closing the gap will effect a predetermined amount of box expansion and pin contraction below the yield point of the material by force transmitted across the interengaged tapers to the box and pin, such predetermined expansion and contraction being associated with the existence of sufficient loading of the tapers to frictionally interlock the pin and the box together. The completely made up joint is illustrated in Figs. 8 and 16.

During turning of the pin into the box beyond the point illustrated in Fig. 6, the seal is radially compressed to a predetermined extent between the recess cylindrical interior wall 30 and the pin taper 18 and cylindrical periphery 17 due to the interfering contacting relation between the pin and the seal. In addition, the seal is axially slightly elongated toward the pin and box tapers 18 and 25 and radially somewhat deformed as seen in Figs. 7, 8 and 16. This latter condition is brought about by the fact that the pin taper 18 extends back into the recess from the pin end 13 to intersect the cylindrical shoulder 17 at knee or shoulder 137 within the recess, thereby forming a clearance 40 between the taper and seal into which some of the seal material can be forced. However, the seal has sufficiently reduced size in relation to the recess and the material has such reduced tendency to flow because of its relatively rigid plastic composition that progressive advancement of the pin cylindrical periphery 17 into the recess will not effect deformation of any seal material into the space between the pin and box tapers 18 and 25 as they are being relatively moved toward interengagement. As a result, the seal is not subjected to any damaging, crushing or shearing action when the joint is made up.

When the joint is broken, the seal may be carried with the pin into engagement with the flat box thread ends 129 circularly spaced about the axis 19 as seen in Fig. 5. The latter intercept seal travel with the pin and prevent its removal from the recess, acting to axially suspend the seal at three points and preventing cocking thereof in the recess such as might otherwise result in jamming and damaging of the seal. The multiple thread ends 129 are disposed similarly to ends 28 shown in Fig. 10, along with the openings therebetween, and are easily seen to be located in an ideal position to prevent seal cocking. Fig. 11 shows a conventional single thread end 130 on a pin for purposes of comparison with Fig. 10. Fig. 12 illustrates what happens to the seal when fluid pressure enters the joint from the string bore 11, the pressure leaking between the end 13 of the pin and stop shoulder 26 in the box and past the interengaged tapers 18 and 25 to press against the right end 42 of the seal. The latter in being urged over the knee 137 toward the thread ends 129 and 28 is wedged between the pin taper 18 and the recess interior wall 30, developing greater sealing pressure against these surfaces. Even through the applied pressure may increase up to 15,000 p.s.i. and beyond, the seal will not extrude into the slight clearances between the thread ends since the latter are formed to extend in a plane normal to the axis 19 of the box and pin when the joint is fully made up, the thread ends forming a flat almost continuous wall to retain the seal.

If, on the other hand, pressure enters the joint from the exterior past the interengaged box and pin tapers 22 and 16 and through labyrinth clearances between the threads to press against the left end 43 of the seal, the latter is urged against right end wall 32 of the recess and against the taper 18 on the shank, these two surfaces meeting at the point where the pin taper tightly engages the box taper 25 blocking escape of the seal from the recess. Thus, such exterior pressure application cannot effect extrusion of the seal from the recess.

In Fig. 13 the pin end portions 14 of a pair of pipes 10 extend oppositely into the two box end portions 20 of a collar 45, each of the box end portions being formed as described above. This form of the invention illustrates its application to collars into which the pin ends of pipe are connectible.

Fig. 14 illustrates another modification of the invention wherein the pin 50 and box 51 include interengaged triple threads 52 and 53 extending on an axial taper such that the thickness of the pin and box wall sections 54 and 55 respectively decrease and increase in the direction from the box end 56 to the pin end 57. The diameters of the pin and box threads are proportioned so that they come together to form a tight fit along their lateral contact surfaces just before the pin end 57 engages the box stop shoulder 58 when the joint is fully made up to limit further turning of the pin into the box.

The arrangement of the groove or recess receiving the seal 33, and pin cylindrical periphery 17 in relation to the pin and box thread ends 28 and 129 remains the same as previously discussed, as well as engagement of the seal 33 by the pin periphery 17 and forward taper 18 acting to press the seal against the recess interior wall 30. The right end wall 32 of the recess extends in the same normal plane as the box shoulder 58, so that the seal remains confined against pressure extrusion outward from the recess under exterior fluid pressure application.

A final modified joint is shown in Fig. 15 to comprise pin and box members 60 and 61 having interengaged triple threads 62 and 63 extending on an axial taper similar to threads 52 and 53 in Fig. 14, and with the pin end 64 engaged against the box stop shoulder 65 stopping further turning of the pin into the box. In this form of the invention, the annular groove 24 receiving the seal 33 as described above is sunk in the box bore 66 and taper 25 between the box outer end 68 and the thread 63, the pin taper 18 and cylindrical periphery 17 engaging the seal and the box taper 25 in the same manner as described in connection with Figs. 1–13. Also, when the joint is fully made up, the pin periphery 17 and taper 18 closely interfit with box bore 66 and taper 25 to confine seal 33 against pressural extrusion from the recess.

It will be understood that by using a connecting collar as shown in Fig. 13, the principles of the invention are applicable to unthreaded standard A.P.I. external upset tubing, and eliminate the necessity for special upsetting of the pipe ends and the requirement for full length normalizing thereof. Also, no special reaming of the stop shoulders, pipe ends and tapered sets is required.

The 29° Stub Acme, 6 pitch, triple lead thread is representative of several forms which can be successfully used. The joint material of course, may comprise steel or certain non-ferrous materials found suitable for pipe and tubing.

I claim:

1. A sealed joint interconnecting a pair of pipes and operative to seal off against both inward and outward fluid pressure leakage through the joint, comprising coaxial pin and box members respectively including interengaged external and internal threads holding the pipes against separation, said pin being screwed about said axis longitudinally forwardly into said box, said pin having a forwardly tapering annular bevel and a cylindrical periphery rearward of and intersecting the bevel and said box member having an annular recess opening inwardly toward and bridging said intersection, said recess having a cylindrical interior wall, said box member closely fitting said pin member at the rearward end of said recess and closing the rearward end thereof and said box member having an annular shoulder at the forward end of said recess closely fitting the pin and closing the forward end of the recess, said pin and box members being positioned with predetermined radial clearance between the pin cylindrical periphery and the interior wall of said recess, an annularly continuous seal of internally tenacious relatively rigid plastic material received in the recess, said seal when uncompressed having throughout an annular extent thereof rearward of said intersection a radial thickness greater than said clearance and said seal rearward annular extent being compressed by and between the pin cylindrical periphery and the interior wall of the recess when the box member annular shoulder closely fits the pin member, said recess being closed and said cylindrical interior wall of the recess and said pin cylindrical periphery axially rearward of said intersection terminating proximate the closed rearward end of said recess, said compressed seal at all times having an overall axial dimension shorter than the overall axial length of said recess so that the seal is axially shiftable in opposite directions by differential pressure exerted on opposite seal ends, said seal axial dimension being sufficiently greater than the longitudinal distance between said intersection and the forward end of the recess that a substantial portion of the seal remains radially compressed throughout said axial shifting of the seal, said seal when positioned within the recess in uncompressed condition having an inner diameter less than the outer diameter of the pin cylindrical periphery.

2. The invention as defined in claim 1 in which said seal comprises a cylindrical annulus of tetrafluoroethylene which remains outwardly spaced from a portion of the pin bevel adjacent said recess in the absence of fluid pressure exertion on the seal.

3. The invention as defined in claim 1 in which said threads comprise multiple threads on each of the pin and box members.

4. The invention as defined in claim 1 in which said threads comprise triple threads on each of the pin and box members.

5. The invention as defined in claim 1 in which the pin and box have interengaged annular tapers rearward of said threads acting at least partially to seal off access of external fluid pressure to said threads, recess and seal.

6. The invention as defined in claim 1 in which said pin and box have interengaged stop shoulders spaced forwardly of said recess.

References Cited in the file of this patent
UNITED STATES PATENTS

| | | |
|---|---|---|
| 1,590,357 | Feisthamel | June 29, 1926 |
| 2,107,716 | Singleton | Feb. 8, 1938 |
| 2,110,825 | Archer | Mar. 8, 1938 |
| 2,150,221 | Hinderliter | Mar. 14, 1939 |
| 2,187,217 | Winslow | Jan. 16, 1940 |
| 2,204,586 | Grau | June 18, 1940 |
| 2,211,179 | Stone | Aug. 13, 1940 |
| 2,450,453 | Baehm | Oct. 5, 1948 |
| 2,508,306 | Thurston et al. | May 16, 1950 |
| 2,553,836 | Stone | May 22, 1951 |
| 2,563,515 | Brown | Aug. 7, 1951 |
| 2,590,565 | Osborn | Mar. 25, 1952 |
| 2,726,104 | Boitnott et al. | Dec. 6, 1955 |
| 2,775,471 | Douglass | Dec. 25, 1956 |